United States Patent
Ho et al.

(10) Patent No.: US 11,722,435 B2
(45) Date of Patent: Aug. 8, 2023

(54) SYSTEM WITH LAYER-ONE SWITCH FOR FLEXIBLE COMMUNICATION INTERCONNECTIONS

(71) Applicant: The United States of America, as represented by the Secretary of the Navy, San Diego, CA (US)

(72) Inventors: Thang Hoang Ho, San Diego, CA (US); Christina Marie de Jesus, La Mesa, CA (US)

(73) Assignee: United States of America as represented by the Secretary of the Navy, Washington, DC (US)

( * ) Notice: Subject to any disclaimer, the term of this patent is extended or adjusted under 35 U.S.C. 154(b) by 29 days.

(21) Appl. No.: 17/530,310

(22) Filed: Nov. 18, 2021

(65) Prior Publication Data

US 2023/0155962 A1 May 18, 2023

(51) Int. Cl.
*H04L 49/15* (2022.01)
*H04L 41/0866* (2022.01)
*H04L 69/323* (2022.01)

(52) U.S. Cl.
CPC .......... *H04L 49/15* (2013.01); *H04L 41/0866* (2013.01); *H04L 69/323* (2013.01)

(58) Field of Classification Search
CPC .... H04L 49/15; H04L 41/0866; H04L 69/323
See application file for complete search history.

(56) References Cited

U.S. PATENT DOCUMENTS

| | | | | |
|---|---|---|---|---|
| 5,321,813 A | * | 6/1994 | McMillen | H04L 49/358 714/E11.01 |
| 5,889,776 A | | 3/1999 | Liang | |
| 6,611,519 B1 | | 8/2003 | Howe | |
| 7,039,046 B1 | * | 5/2006 | Simons | H04L 49/15 370/503 |
| 7,751,329 B2 | * | 7/2010 | Lapuh | H04L 49/552 709/239 |
| 8,014,388 B2 | | 9/2011 | Edwards, III | |
| 8,140,655 B1 | * | 3/2012 | Schantz | G06F 9/5061 709/224 |
| 8,284,770 B1 | | 10/2012 | Levis | |
| 9,853,879 B2 | * | 12/2017 | Walker | H04L 43/50 |
| 10,491,462 B1 | * | 11/2019 | Wagner | H04L 41/0803 |

(Continued)

FOREIGN PATENT DOCUMENTS

| AU | 2014101296 | | 11/2014 |
|---|---|---|---|
| CN | 212675415 U | * | 3/2021 |
| CN | 113271268 | | 8/2021 |

*Primary Examiner* — Shah M Rahman
(74) *Attorney, Agent, or Firm* — Naval Information Warfare Center Pacific; Kyle Eppele; James R. McGee

(57) ABSTRACT

A system with flexible communication interconnections includes devices and a layer-one switch interconnecting disjoint pairings of communication interfaces. The devices each have at least one communication interface. The layer-one switch has ports, each coupled to a respective one of the communication interfaces, which include the communication interface of each of the devices. For every pairing of a first and different second one of the ports within the disjoint pairings, the layer-one switch is configurable to interconnect bidirectional communications between the respective communication interface for the first port and the respective communication interface for the second port.

9 Claims, 2 Drawing Sheets

(56) References Cited

U.S. PATENT DOCUMENTS

| | | | |
|---|---|---|---|
| 11,057,498 B1* | 7/2021 | Deshpande | H04L 67/10 |
| 2002/0165962 A1* | 11/2002 | Alvarez | H04L 41/0843 |
| | | | 709/230 |
| 2005/0129033 A1* | 6/2005 | Gordy | H04L 63/1416 |
| | | | 370/366 |
| 2005/0238052 A1* | 10/2005 | Yamazaki | G06F 15/17393 |
| | | | 370/395.5 |
| 2007/0274204 A1* | 11/2007 | Varada | H04L 49/552 |
| | | | 370/412 |
| 2008/0049627 A1* | 2/2008 | Nordin | H04Q 1/136 |
| | | | 370/241 |
| 2008/0212610 A1* | 9/2008 | Ward | H04L 12/66 |
| | | | 370/469 |
| 2010/0002588 A1* | 1/2010 | Cantwell | H04L 43/18 |
| | | | 370/241 |
| 2010/0316334 A1* | 12/2010 | Kewitsch | G02B 6/3564 |
| | | | 901/2 |
| 2012/0110184 A1* | 5/2012 | Uhlhorn | H04L 41/12 |
| | | | 726/1 |
| 2012/0110385 A1* | 5/2012 | Fleming | H04L 41/0803 |
| | | | 714/39 |
| 2012/0124257 A1* | 5/2012 | Wu | H04L 49/109 |
| | | | 326/38 |
| 2012/0284379 A1* | 11/2012 | Zievers | H04L 43/0811 |
| | | | 709/222 |
| 2014/0254397 A1* | 9/2014 | Eddy | H04L 7/10 |
| | | | 370/250 |
| 2015/0222533 A1* | 8/2015 | Birrittella | H04L 5/0055 |
| | | | 370/392 |
| 2017/0048133 A1 | 2/2017 | Walker | |
| 2017/0085422 A1* | 3/2017 | Chapman | H04L 41/0803 |
| 2017/0163342 A1* | 6/2017 | Testa | H04Q 11/0003 |
| 2018/0013657 A1* | 1/2018 | Cantwell | H04L 43/08 |
| 2020/0244595 A1* | 7/2020 | Snowdon | H04L 49/201 |
| 2021/0119938 A1* | 4/2021 | Pelekhaty | H04L 45/24 |

\* cited by examiner

SYSTEM WITH LAYER-ONE SWITCH FOR FLEXIBLE COMMUNICATION INTERCONNECTIONS

FEDERALLY-SPONSORED RESEARCH AND DEVELOPMENT

The United States Government has ownership rights in this invention. Licensing and technical inquiries may be directed to the Office of Research and Technical Applications, Naval Information Warfare Center Pacific, Code 72120, San Diego, Calif., 92152; voice (619) 553-5118; ssc_pac_t2@navy.mil. Reference Navy Case Number 111108.

BACKGROUND OF THE INVENTION

Reconfiguring a network topology to add devices or optimize performance typically requires disconnecting and reconnecting cables or redesigning a backplane and its wiring. Such changes themselves are time consuming, and frequently testing and qualifying such changes is especially time consuming. There is a general need for rapid reconfiguration of network topology.

SUMMARY

A system with flexible communication interconnections includes devices and a layer-one switch interconnecting disjoint pairings of communication interfaces. The devices each have at least one communication interface. The layer-one switch has ports, each coupled to a respective one of the communication interfaces, which include the communication interface of each of the devices. For every pairing of a first and different second one of the ports within the disjoint pairings, the layer-one switch is configurable to interconnect bidirectional communications between the respective communication interface for the first port and the respective communication interface for the second port.

BRIEF DESCRIPTION OF THE DRAWINGS

Throughout the several views, like elements are referenced using like references. The elements in the figures are not drawn to scale and some dimensions are exaggerated for clarity.

DETAILED DESCRIPTION OF EMBODIMENTS

The disclosed systems below may be described generally, as well as in terms of specific examples and/or specific embodiments. For instances where references are made to detailed examples and/or embodiments, it should be appreciated that any of the underlying principles described are not to be limited to a single embodiment, but may be expanded for use with any of the other methods and systems described herein as will be understood by one of ordinary skill in the art unless otherwise stated specifically.

The inventors have discovered that rapid reconfiguration of network topology is achieved with a layer-one switch that is configurable to interconnect bidirectional communications between communication interfaces because this eliminates disconnecting and reconnecting cables or redesigning the wiring included on a backplane that were previously required for reconfiguration of network topology. Latency through the layer-one switch is minimal because the layer-one switch does not examine any contents of the bidirectional communications. However, eliminating manual operations, such as disconnecting and reconnecting cables, produces the vulnerability that malicious software could attack the layer-one switch with communication traffic that ultimately reconfigures the network topology, leading to system failure. The inventors have further discovered that requiring physical access to the layer-one switch during reconfiguration of network topology eliminates this vulnerability to malicious software. Reconfiguration of network topology generally requires testing and requalification that is especially time consuming. However, the inventors have yet further discovered that such testing and requalification is not needed when the layer-one switch is designed so that the logic function implemented in the layer-one switch is unchanged during the reconfiguration, which merely changes the values in a configuration register of the logic function.

Embodiments of the invention describe a reconfigurable interconnect system that creates flexible network platforms enabling rapid iterative approaches to design, development, and testing of virtualized and software-defined network architectures. The reconfiguration of network topology capability allows the same system to support myriad applications, which lowers total cost of ownership and enables routine addition and replacement of hardware components without necessarily changing the design of the network system.

Figure 1:
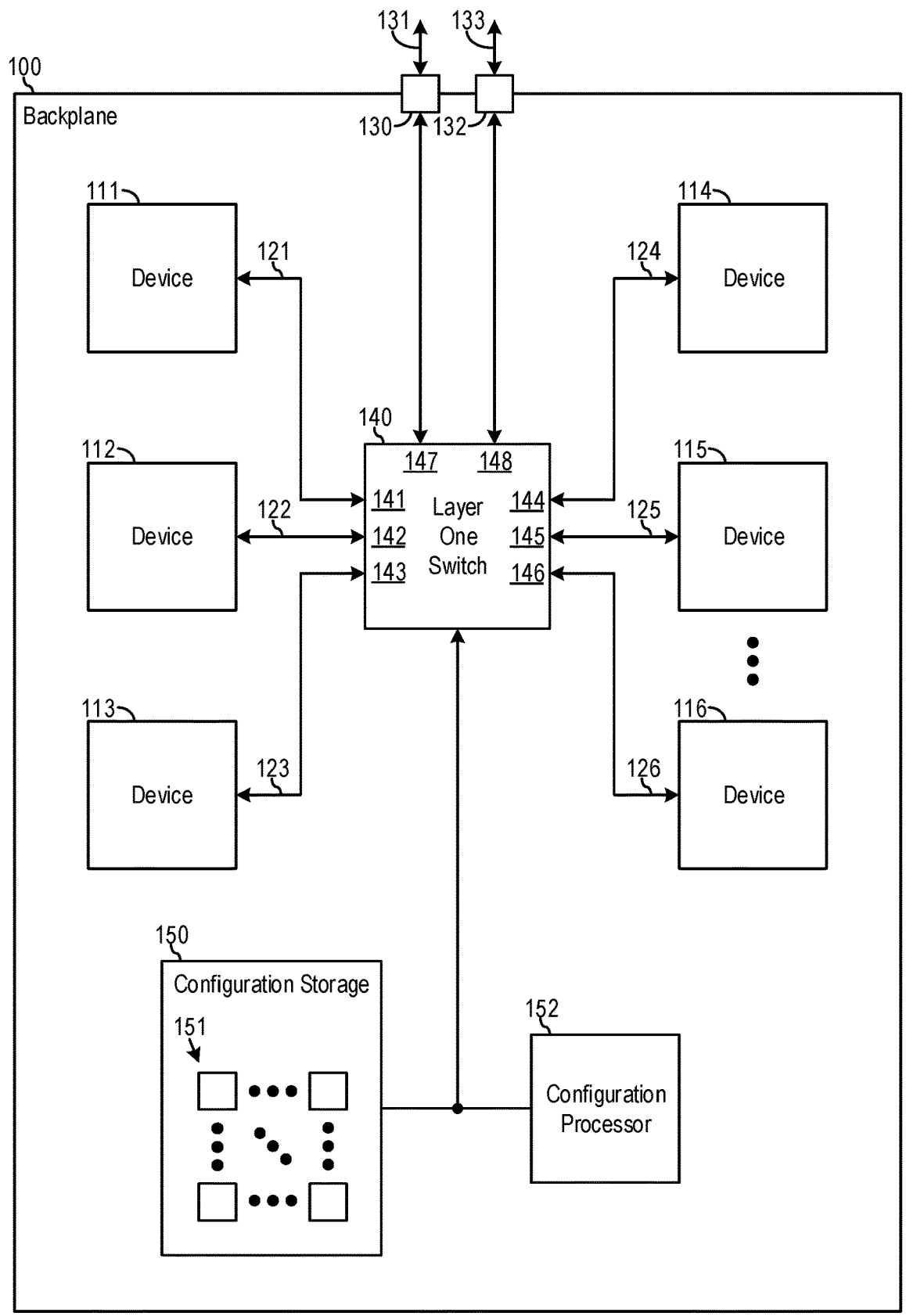
FIG. 1 is a block diagram of a backplane with flexible communication interconnections in accordance with an embodiment of the invention.

FIG. 1 is a block diagram of a backplane 100 with flexible communication interconnections in accordance with an embodiment of the invention. In this embodiment, backplane 100 is a printed circuit board providing physical support for a system with the flexible communication interconnections.

Devices 111, 112, 113, 114, and 115 through 116 are mounted on the backplane 100 and each has one or more of the communication interfaces 121, 122, 123, 124, and 125 through 126. The backplane 100 optionally includes connectors 130 and 132 mounted on the backplane 100 for respectively connecting to external communication interfaces 131 and 133.

The layer-one switch 140 is mounted on the backplane 100 and has ports 141, 142, 143, 144, 145, 146, 147, and 148, each coupled to a respective one of the communication interfaces 121, 122, 123, 124, and 125 through 126 and the external communication interfaces 131 and 133. Thus, the backplane 100 couples each of the ports 141, 142, 143, 144, 145, 146, 147, and 148 of the layer-one switch to 140 the respective one of the communication interfaces, which include not only the communication interfaces 121, 122, 123, 124, and 125 through 126 of the devices 111, 112, 113, 114, and 115 through 116, but also includes the external communication interfaces 131 and 133.

The layer-one switch 140 is configurable to interconnect bidirectional communications between the respective communication interfaces for every pairing of a first and different second one of the ports 141, 142, 143, 144, 145, 146, 147, and 148. In a specific example, the layer-one switch 140 is configurable to interconnect bidirectional communications between the communication interfaces 121 and 131 via a pairing of ports 141 and 147, between the communication interfaces 122 and 133 via a pairing ports 142 and 148, between the communication interfaces 123 and 125 via a pairing ports 143 and 145, and between the communication interfaces 124 and 126 via a pairing ports 144 and 146. The configured pairings of ports 141, 142, 143, 144, 145, 146, 147, and 148 are disjoint; each of ports 141, 142, 143, 144, 145, 146, 147, and 148 appears in at most one of the pairings, with any unused ports appearing in none of the configured pairings. Thus, if the layer-one switch 140 has and even number of N ports, there exist N×(N−1)/2 possible disjoint pairings that each use all of the N ports.

The layer-one switch 140 is configurable to interconnect the bidirectional communications without examining any contents of the bidirectional communications. In one embodiment, the communication interfaces 121, 122, 123, 124, and 125 through 126 of the devices 111, 112, 113, 114, and 115 through 116, and the communication interfaces 131 and 133 are packetized communication interfaces, such as an Ethernet interfaces, and the layer-one switch 140 detects a start and an end of each packet received over each of the packetized communication interfaces. The layer-one switch 140 stores and forwards packet contents spanning between the start and the end of each packet received over each of the packetized communication interfaces, but the layer-one switch 140 is configurable to interconnect the bidirectional communications without examining the contents of any packet. In particular, the layer-one switch 140 does not switch the packets based upon packet addresses, such as a MAC address or an IP destination address contained within an Ethernet packet. Therefore, the layer-one switch 140 switches at layer one. In contrast, switching based on packet contents, such as a MAC address contained within an Ethernet packet, is switching at layer two or a higher layer of the communication protocol.

Latency of the bidirectional communications reduces from not examining any contents of the bidirectional communications. More importantly, robustness increases because communications cannot be diverted by inadvertent or malicious corruption of the bidirectional communications, such as corruption of the MAC address or the IP destination address contained within an Ethernet packet.

A storage arrangement 150 is mounted on the backplane 100 and coupled to the layer-one switch 140. The storage arrangement 150 stores a configuration specifying the disjoint pairings of the ports 141, 142, 143, 144, 145, 146, 147, and 148. In one embodiment, the storage arrangement 150 includes manually-operated configuration switches 151 specifying the first and second ports of each of the disjoint pairings having the bidirectional communications. In one example, the manually-operated configuration switches 151 include a row for each of the ports 141, 142, 143, 144, 145, 146, 147, and 148, and the switches in the row encode a binary identifier of the paired port. In another example with an even number of N ports, there is N/2 pairings using every port, and the manually-operated configuration switches 151 include a row for each of the N/2 pairings, and the switches in the row encode binary identifiers of the both the first and different second ports of the pairing. The manually-operated configuration switches 151 optionally include additional information of the stored configuration, such as enabling a loopback testing mode connecting bidirectional communications to and from each of the ports 141, 142, 143, 144, 145, 146, 147, and 148.

Upon power-up of the backplane 100 and the layer-one switch 140, the layer-one switch 140 reads the configuration from the manually-operated configuration switches 151. Because the manually-operated configuration switches 151 could encode invalid pairings, such as pairings that are not disjoint or are not bidirectional, the layer-one switch 140 verifies a criterion that the configuration stored in the manually-operated configuration switches 151 properly specifies the disjoint pairings of the ports. After verifying the criterion, for each of the disjoint pairings of the first and the different second one of the ports 141, 142, 143, 144, 145, 146, 147, and 148, the layer-one switch 140 interconnects the bidirectional communications between the first and second ports according to the configuration.

The configuration stored in the manually-operated configuration switches 151 cannot be altered without manual access to the backplane 100 and the manually-operated configuration switches 151. By preventing physical access to the backplane 100 from malicious actors, the configuration stored in storage arrangement 150 is secured from such malicious actors. Optionally, a configuration processor 152 is mounted on the backplane 100 and coupled to the layer-one switch 140. After the initial configuration has been transferred from storage arrangement 150 to the layer-one switch 140, the configuration processor 152 can modify the initial configuration inside the layer-one switch 140. To limit vulnerability from a maliciously impaired configuration processor 152, the permitted changes are constrained. The configuration processor 152 is omitted in a more secure embodiment.

Figure 2:
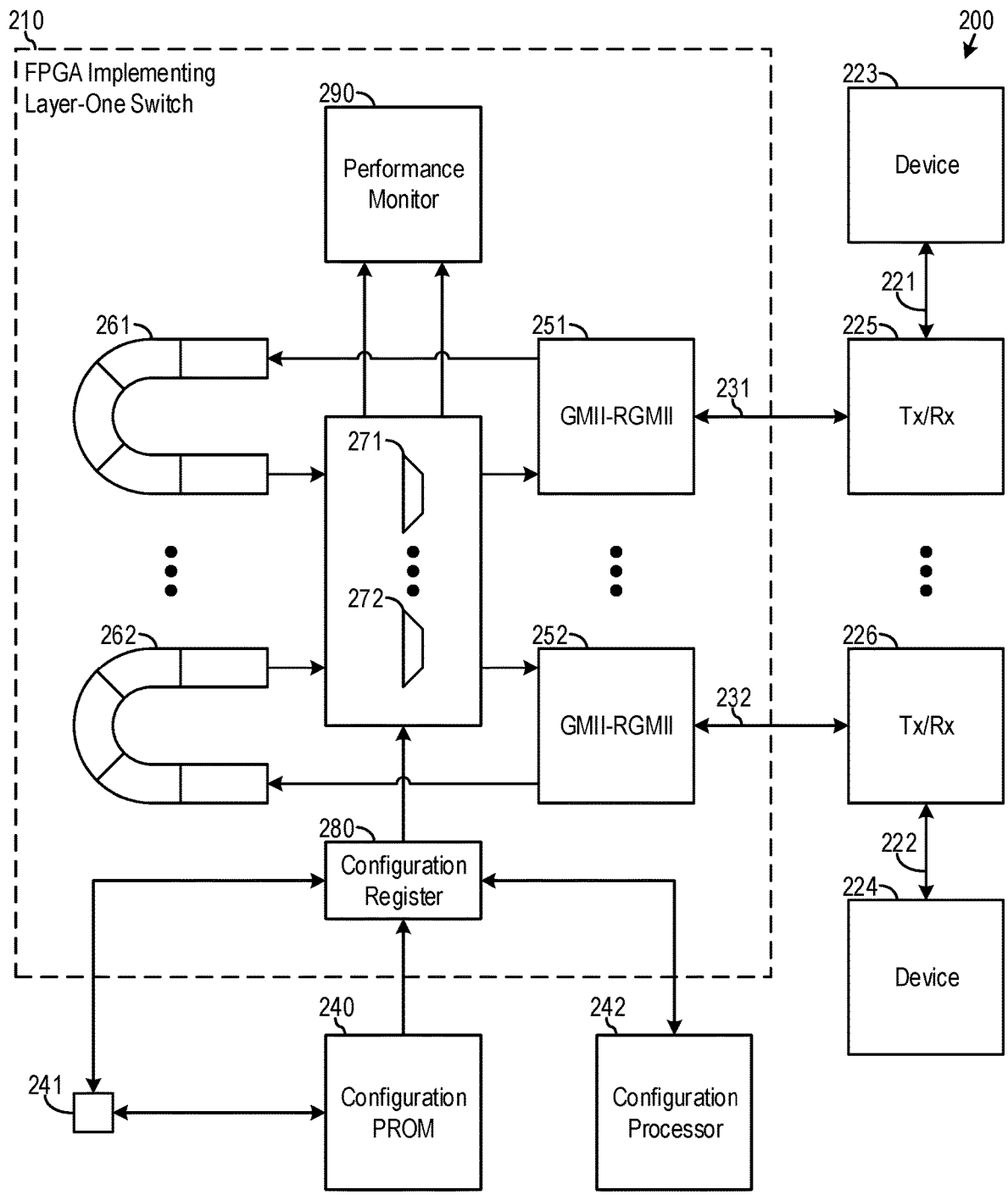
FIG. 2 is a block diagram of a system including a layer-one switch providing flexible communication interconnections in accordance with an embodiment of the invention.

FIG. 2 is a block diagram of a system 200 including a layer-one switch 210 providing flexible communication interconnections in accordance with an embodiment of the invention. In one embodiment, the layer-one switch 210 is a field programmable gate array (FPGA) implementing a configured logic function.

The system 200 includes devices 223 through 224 each having at least one communication interface 221 through 222. The layer-one switch 210 has ports 231 through 232, each coupled to a respective one of a plurality of communication interfaces 221 through 222 of the devices 223 through 224. For example, transceiver 225 couples port 231 and communication interface 221, and transceiver 226 couples port 232 and communication interface 222. For every pairing of the disjoint pairings of a first and different second one of the ports 231 through 232, the layer-one switch 210 is configurable to interconnect bidirectional communications between the respective communication interface 221 for the first port 231 of the pairing and the respective communication interface 222 for the second port 232 of the pairing.

The system 200 includes a storage arrangement 240 coupled to the layer-one switch 210. The storage arrangement 240 stores a configuration specifying the disjoint pairings of the ports 231 through 232. The configuration stored in the storage arrangement 240 cannot be altered without physical access to the system 200. In an embodiment having an FPGA for the layer-one switch 210, the storage arrangement 240 is a programmable read-only memory (PROM) for storing the configuration, which specifies the disjoint pairings of the ports 231 through 232 and further specifies a logic function for implementing the layer-one switch 210 within the FPGA. Upon power-up, the FPGA accepts the configuration from the PROM of storage arrangement 240, and, for each of the disjoint pairings of the first and the different second one of the ports 231 through 232, internally interconnects the bidirectional communications between the first and second ports according to the configuration.

An interface 251 separates the bidirectional communications through port 231 into incoming unidirectional communication transferred from port 231 to first-in-first-out (FIFO) queue 261, and outgoing unidirectional communication transferred from multiplexer 271 to port 231. In one embodiment, the interface 251 is a Gigabit Media Independent Interface (GMII) to Reduced Gigabit Media Independent Interface (RGMII) that implements the digital portion of layer one of the Ethernet protocol, and the transceiver 225 is a Media Dependent Interface (MDI) that implements the analog portion of layer one of the Ethernet protocol. Similarly, interface 252 separates the bidirectional communications through port 232 into incoming and outgoing unidirectional communications, with the incoming unidirectional communication transferred to FIFO queue 262.

A respective queue 261 through 262 is associated with each of the ports 231 through 232 of the layer-one switch 210. In one embodiment, the queue 261 stores each packet received at the associated port 231, and the queue 262 stores each packet received at the associated port 232.

A respective multiplexer 271 through 272 is associated with each of the ports 231 through 232 of the layer-one switch 210. The multiplexer 271 transfers a unidirectional communication from the respective queue 261 through 262 that is associated with a selected one of ports 231 through 232. The multiplexer 271 transfers the unidirectional communication from the selected one of the ports 231 through 232 via the associated queue to the port 231 associated with multiplexer 271 according to the disjoint pairings as specified in the configuration stored in the storage arrangement 240. In normal operation, multiplexer 271 associated with port 231 never selects unidirectional communication from port 231 via queue 261; however, a loopback testing mode could include a multiplexer selecting its associated port. Similarly, the respective multiplexer 272 associated with port 232 transfers a unidirectional communication from a selected one of the ports 231 through 232 via the appropriate one of the queues 261 through 262.

To establish bidirectional communications between two ports 231 and 232, multiplexer 271 is configured to establish unidirectional communication from port 232 to port 231 via queue 262, and multiplexer 272 is configured to establish unidirectional communication from port 231 to port 232 via queue 261. Generally, for each of the disjoint pairings, the respective multiplexer associated with the first port of the disjoint pairing selects the unidirectional communication transferred to the first port from the respective queue associated with the selected port, which is the second port of the disjoint pairing, and the respective multiplexer associated with the second port of the disjoint pairing selects the unidirectional communication transferred to the second port from the respective queue associated with the selected port, which is the first port of the disjoint pairing.

A configuration register 280 configures the multiplexers 271 through 272. For example, the configuration register 280 includes a value of a selection code for each of the multiplexers 271 through 272, and the values of the selection codes are initialized from the storage arrangement 240. The multiplexer 271 selects one of the queues 261 through 262 specified by the value of the selection code for the multiplexer 271, and the multiplexer 271 transfers unidirectional communication from the selected queue to the associated port 231. Generally, the configuration from the storage arrangement 240 specifies that the respective multiplexer associated with the first port of each of the disjoint pairings selects the unidirectional communication from the selected port that is the second port of the disjoint pairing, and the configuration from the storage arrangement 240 further specifies that the respective multiplexer associated with the second port of each of the disjoint pairings selects the unidirectional communication from the selected port that is the first port of the disjoint pairing.

The configuration from the manually-operated configuration switches 151 of FIG. 1 similarly specifies that the respective multiplexer associated with each port of each disjoint pairing selects the unidirectional communication from the other port of the disjoint pairing.

With physical access to the system 200 of FIG. 2, a programmer is attachable to the programming connector 241, such as a TAP port connector or an I$^2$C connector. Via the programming connector 241, the programmer updates the configuration stored in the storage arrangement 240. For the layer-one switch 210 implemented in an FPGA, this could include completely changing the logic function implemented in the FPGA, such as changing the logic function to directly connects ports 231 through 232, potentially without needing queues 261 through 262 and multiplexers 271 through 272. However, such a drastic change would require significant time testing and qualifying the changed logic function.

In contrast, embodiments of the invention never change the logic function implemented in the FPGA; instead, only the values stored in the configuration register 280 are changed to reconfigure the interconnected pairings of ports 231 through 232. Because the logic function implemented in the FPGA remains unchanged, system 200 is quickly reconfigurable without requiring any additional testing of the layer-one switch 210. This is an important advantage of the invention justifying the additional overhead, including as multiplexers 271 through 272.

For the layer-one switch 210 implemented in an FPGA, the initial values of the configuration register 280 are determined by the configuration stored in the PROM of the storage arrangement 240. With physical access to the system 200, the programmer connected to programming connector 241 can reprogram the entire configuration stored in the PROM of the storage arrangement 240. However, the configuration is generated by linking two components, which include a fixed component and a variable component. The fixed component implements the logic function including the interfaces 251 through 252, the queues 261 through 262, the multiplexers 271 through 272, and the configuration register 280. The variable component specifies the values stored in the configuration register 280. Thus, after linking these two components with the variable component changed to store different values in the configuration register 280, the exact same configuration is generated except for the portion specifying the initial values of the configuration register 280. Alternatively, the programmer connected to programming connector 241 changes only the portion of the configuration specifying the initial values of the configuration register 280.

In one embodiment, the logic function implemented in the FPGA additionally provides access to the values stored in the configuration register 280 via the programming connector 241 without providing any other access to the logic function implemented in the FPGA. Thus, with physical access to the system 200, after the configuration register 280 is initialized with values from the configuration stored in the PROM of the storage arrangement 240, the programmer connected to programming connector 241 can change these initial values of the configuration register 280 via the logic function implemented in the FPGA, but without changing the logic function implemented within the FPGA.

Similarly, a configuration processor 242 can change the initial values of the configuration register 280 via the logic function implemented in the FPGA in one embodiment, and this changes the disjoint pairings of the ports 231 through 232. However, the configuration processor 242 cannot change the logic function implemented within the FPGA, and the configuration processor 242 cannot change the configuration stored in the PROM of the storage arrangement 240. Furthermore, upon every power-up of the FPGA implementing the layer-one switch 210, the FPGA is configured always to implement the logic function unchanged with the configuration register 280 initialized with values from the configuration stored in the PROM of the storage arrangement 240. For either initial or updated values of the configuration register 280, before actually configuring the multiplexers 271 through 272 to interconnect the bidirectional communications, the logic function verifies the criterion that the values of the configuration register 280 properly specify disjoint and bidirectional pairings of the ports. The dynamic reconfiguration from configuration processor 242 provides seamless integration with Software Defined Networking (SDN), especially when the logic function further permits the configuration processor 242 to change the configuration, such as the data rate, of the interfaces 251 through 252 and the transceivers 225 through 226. In one embodiment, the configuration processor 242 is a processor embedded within the FPGA implementing the layer-one switch 210. In one embodiment, the communication interfaces 221 through 222 are packetized communication interfaces, such as an Ethernet interface having a respective data rate selected among 10 Megabit, 100 Megabit, or 1 Gigabit, with the respective data rate differing between at least two of the packetized communication interfaces. The queues 261 through 262 provide buffering to accommodate variation from nominal data rates between the packetized communication interfaces 221 through 222.

For example, the queue 261 is a synchronizer FIFO queue, which is written at a data rate defined by packetized communication interface 221 and read at the same nominal data rate defined by packetized communication interface 222. Thus, packetized communication interfaces 221 and 222 have nominally the same data rate, but their data rates differ when their data rates are independently generated and hence have slight different data rates within a maximum allowed tolerance. Due to the differing data rates, some buffering is needed to the extent of the maximum allowed tolerance between independently generated data rates over the maximum allowed packet size. This ensures that queue 261 does not underflow when forwarding from a communication interface 221 having a data rate at the slow end of the maximum allowed tolerance to a communication interface 222 having the same nominal data rate at the fast end of the maximum allowed tolerance. In this example, multiplexer 271 selects the unidirectional communication from queue 261 associated with the particular port 231 to the associated port 232 of multiplexer 271. Multiplexer 271 begins forwarding each packet partially stored in the queue 261 before the packet is completely stored in the queue 261, with a minimum latency between a start of storing and a start of forwarding of the packet depending upon a maximum allowed size for the packet and respective data rates through ports 231 and 232.

Thus, a minimum latency between a start of storing and a start of forwarding of each packet depends upon a maximum allowed size for the packet and respective data rates of the communication interfaces 221 through 222 and their ports 231 through 232.

In one embodiment, the layer-one switch 210 includes a performance monitor 290 for collecting performance statistics, which include an average number of packets and average amount of packet data stored in the respective queues 261 through 262 associated with each of the ports 231 through 232 of the layer-one switch 210. The layer-one switch 210 is further configurable to interconnect unidirectional communication from the respective communication interfaces 221 through 222 for each of the ports 231 through 232 to the performance monitor 290 for collecting the performance statistics. These performance statistics include information obtained from examining a content of the unidirectional communication, such as bit errors detected from a cyclic redundancy check (CRC). However, the layer-one switch 210 remains configurable to interconnect the bidirectional communications between the ports 231 through 232 without examining a content of the bidirectional communications. To monitor bidirectional communications over paired ports 231 and 232, the unidirectional communication for each port is separately routed to the performance monitor 290.

From the above description of System with Layer-One Switch for Flexible Communication Interconnections, it is manifest that various techniques may be used for implementing the concepts of backplane 100 and system 200 without departing from the scope of the claims. The described embodiments are to be considered in all respects as illustrative and not restrictive. The method/apparatus disclosed herein may be practiced in the absence of any element that is not specifically claimed and/or disclosed herein. It should also be understood that backplane 100 or system 200 is not limited to the particular embodiments described herein, but is capable of many embodiments without departing from the scope of the claims.

We claim:

1. A system with flexible communication interconnections, comprising:
a plurality of devices each having at least one communication interface;
a layer-one switch having a plurality of ports, each coupled to a respective one of a plurality of communication interfaces, which include the at least one communication interface of each of the devices, wherein for every pairing of a plurality of disjoint pairings of a first and different second one of the ports, the layer-one switch is configurable to interconnect bidirectional communications between the respective communication interface for the first port and the respective communication interface for the second port;
a backplane having the flexible communication interconnections, wherein the devices and the layer-one switch are mounted on the backplane, which couples each of the ports of the layer one switch to the respective one of the communication interfaces; and
a storage arrangement mounted on the backplane and coupled to the layer-one switch, the storage arrangement for storing a configuration specifying the plurality of disjoint pairings of the ports,
wherein the storage arrangement includes a plurality of manually-operated configuration switches specifying the first and second ports of each of the plurality of disjoint pairings having the bidirectional communications.

2. The system of claim 1, wherein the layer-one switch includes:

a respective multiplexer associated with each port of the ports, the respective multiplexer selecting unidirectional communication from a selected one of the ports to the associated port, wherein:

the configuration from the manually-operated configuration switches specifies that the respective multiplexer associated with the first port of each one of the disjoint pairings selects the unidirectional communication from the selected port that is the second port of the one of the disjoint pairings; and the configuration from the manually-operated configuration switches further specifies that the respective multiplexer associated with the second port of each one of the disjoint pairings selects the unidirectional communication from the selected port that is the first port of the one of the disjoint pairings.

3. The system of claim 2, wherein, upon power-up of the backplane and the layer-one switch, the layer-one switch is adapted to:

read the configuration from the manually-operated configuration switches, verify a criterion that the configuration stored in the manually-operated configuration switches properly specifies the disjoint pairings of the ports having the bidirectional communications, and, in response to the criterion being verified, for each of the disjoint pairings of the first and the different second one of the ports, configure the respective multiplexer associated with each of the first and second ports to interconnect the bidirectional communications between the first and second ports according to the configuration.

4. The system of claim 3, wherein the configuration stored in the manually-operated configuration switches cannot be altered without manual access to the backplane and the manually-operated configuration switches.

5. A system with flexible communication interconnections, comprising:

a plurality of devices each having at least one communication interface;

a layer-one switch having a plurality of ports, each coupled to a respective one of a plurality of communication interfaces, which include the at least one communication interface of each of the devices, wherein for every pairing of a plurality of disjoint pairings of a first and different second one of the ports, the layer-one switch is configurable to interconnect bidirectional communications between the respective communication interface for the first port and the respective communication interface for the second port, wherein the layer-one switch includes a respective multiplexer associated with each port of the ports, the respective multiplexer selecting unidirectional communication from a selected one of the ports to the associated port;

a storage arrangement coupled to the layer-one switch, the storage arrangement for storing a configuration specifying the plurality of disjoint pairings of the ports, wherein the configuration stored in the storage arrangement cannot be altered without physical access to the system; and a backplane having the flexible communication interconnections, wherein:

upon power-up of the layer-one switch, the layer-one switch is adapted to accept the configuration from the storage arrangement, and, for each of the disjoint pairings of the first and the different second one of the ports, to internally interconnect the bidirectional communications between the first and second ports according to the configuration;

the configuration from the storage arrangement specifies that the respective multiplexer associated with the first port of each one of the disjoint pairings selects the unidirectional communication from the selected port that is the second port of the one of the disjoint pairings;

the configuration from storage arrangement further specifies that the respective multiplexer associated with the second port of each one of the disjoint pairings selects the unidirectional communication from the selected port that is the first port of the one of the disjoint pairings;

the devices, the layer-one switch, and the storage arrangement are mounted on the backplane;

the layer-one switch is a field programmable gate array (FPGA);

the storage arrangement is a programmable read-only memory for storing the configuration, which specifies the plurality of disjoint pairings of the ports and further specifies a logic function for implementing the layer-one switch within the FPGA;

the configuration stored in the programmable read-only memory cannot be altered without physical access to the backplane; and when the FPGA is configured with the configuration from the programmable read-only memory, the FPGA implements the layer-one switch within the logic function, which includes the respective multiplexer associated with each port of the ports, with the respective multiplexer selecting the unidirectional communication from the selected one of the ports to the associated port according to the plurality of disjoint pairings of the ports as specified in the configuration.

6. The system of claim 5, wherein, upon every power-up of the backplane and the FPGA, the FPGA is configured always to implement the logic function unchanged, but with physical access to the backplane the plurality of disjoint pairings of the ports is changeable either in the configuration stored in the programmable read-only memory or via the logic function implemented in the FPGA, but without changing the logic function implemented within the FPGA.

7. The system of claim 6, further comprising a configuration processor mounted on the backplane and adapted to change, without changing the logic function implemented within the FPGA, the plurality of disjoint pairings of the ports via the logic function implemented in the FPGA, but the configuration processor cannot change the configuration stored in the programmable read-only memory.

8. A system with flexible communication interconnections, comprising:

a plurality of devices each having at least one communication interface; and a layer-one switch having a plurality of ports, each coupled to a respective one of a plurality of communication interfaces, which include the at least one communication interface of each of the devices, wherein for every pairing of a plurality of disjoint pairings of a first and different second one of the ports, the layer-one switch is configurable to interconnect bidirectional communications between the respective communication interface for the first port and the respective communication interface for the second port, wherein the layer-one switch includes:
a respective queue associated with each of the ports of the layer one switch, the respective queue adapted to store each packet received at the associated port; and
a respective multiplexer associated with each of the ports of the layer one switch, the respective multiplexer selecting unidirectional communication of each packet stored in the respective queue associated with a selected one of the ports to the associated port of the respective multiplexer, and
wherein:
the respective multiplexer associated with the first port of each one of the disjoint pairings selects the unidirectional communication from the respective queue associated with the selected port, which is the second port of the one of the disjoint pairings, to the first port,
the respective multiplexer associated with the second port of each one of the disjoint pairings selects the unidirectional communication from the respective queue associated with the selected port, which is the first port of the one of the disjoint pairings, to the second port, and
the respective multiplexer, which selects the unidirectional communication from the respective queue associated with a particular one of the ports to the associated port of the respective multiplexer, is adapted to begin forwarding each packet partially stored in the respective queue associated with the particular port before the packet is completely stored in the respective queue associated with the particular port, with a minimum latency between a start of storing and a start of forwarding of the packet depending upon a maximum allowed size for the packet and respective data rates of the particular port and the associated port of the respective multiplexer.

9. A system with flexible communication interconnections, comprising:
a plurality of devices each having at least one communication interface;
a layer-one switch having a plurality of ports, each coupled to a respective one of a plurality of communication interfaces, which include the at least one communication interface of each of the devices, wherein for every pairing of a plurality of disjoint pairings of a first and different second one of the ports, the layer-one switch is configurable to interconnect bidirectional communications between the respective communication interface for the first port and the respective communication interface for the second port; and
a performance monitor for collecting performance statistics, which include an average amount of packet data stored in the respective queue associated with each of the ports of the layer-one switch,
wherein the layer-one switch includes:
a respective queue associated with each of the ports of the layer one switch, the respective queue adapted to store each packet received at the associated port; and
a respective multiplexer associated with each of the ports of the layer one switch, the respective multiplexer selecting unidirectional communication of each packet stored in the respective queue associated with a selected one of the ports to the associated port of the respective multiplexer, and
wherein:
the respective multiplexer associated with the first port of each one of the disjoint pairings selects the unidirectional communication from the respective queue associated with the selected port, which is the second port of the one of the disjoint pairings, to the first port,
the respective multiplexer associated with the second port of each one of the disjoint pairings selects the unidirectional communication from the respective queue associated with the selected port, which is the first port of the one of the disjoint pairings, to the second port, and
the layer-one switch is further configurable to interconnect unidirectional communication from the respective communication interface for each of the ports to the performance monitor for collecting the performance statistics, which further include information obtained from examining a content of the unidirectional communication, but the layer-one switch is configurable to interconnect the bidirectional communications without examining a content of the bidirectional communications.

\* \* \* \* \*